US012757011B2

(12) United States Patent
Lee et al.

(10) Patent No.: US 12,757,011 B2
(45) Date of Patent: Oct. 6, 2026

(54) DEVICE AND METHOD FOR TRANSMITTING SIGNAL IN WIRELESS COMMUNICATION SYSTEM

(71) Applicant: LG Electronics Inc., Seoul (KR)

(72) Inventors: Kyung Ho Lee, Seoul (KR); Sangrim Lee, Seoul (KR); Yeong Jun Kim, Seoul (KR); Sungjin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 495 days.

(21) Appl. No.: 18/039,878

(22) PCT Filed: Nov. 30, 2021

(86) PCT No.: PCT/KR2021/095114
§ 371 (c)(1),
(2) Date: Jun. 1, 2023

(87) PCT Pub. No.: WO2022/119424
PCT Pub. Date: Jun. 9, 2022

(65) Prior Publication Data
US 2024/0007849 A1 Jan. 4, 2024

(30) Foreign Application Priority Data
Dec. 1, 2020 (KR) ........................ 10-2020-0165432

(51) Int. Cl.
*H04W 12/00* (2021.01)
*H04W 12/02* (2009.01)
*H04W 72/04* (2023.01)

(52) U.S. Cl.
CPC ........... *H04W 12/02* (2013.01); *H04W 72/04* (2013.01)

(58) Field of Classification Search
CPC .............................. H04W 12/02; H04W 72/04
See application file for complete search history.

(56) References Cited

U.S. PATENT DOCUMENTS

2016/0149605 A1* 5/2016 Vecera .................. H04M 15/49 455/558
2021/0051678 A1* 2/2021 Suzaki .................. H04W 24/10
(Continued)

FOREIGN PATENT DOCUMENTS

CN 110443060 A * 11/2019 ......... G06F 21/6245
CN 111669366 9/2020
(Continued)

OTHER PUBLICATIONS

Kifer et al., "Guidelines for implementing and Auditing Differentially Private Systems," CoRR, Submitted on Feb. 10, 2020, arXiv:2002.04049v2, 34 pages.
(Continued)

*Primary Examiner* — Khai M Nguyen
(74) *Attorney, Agent, or Firm* — Fish & Richardson P.C.

(57) ABSTRACT

The present disclosure relates to a method of operating a terminal according to an embodiment, including receiving, by the terminal, federated learning-related configuration information from a base station, configuring, by the terminal, a resource associated with federated learning based on the federated learning-related configuration information, transmitting, by the terminal, a differential privacy level to the base station, receiving, by the terminal, the differential privacy-related information from the base station, generating, by the terminal, a pseudo random sequence based on the differential privacy-related information, and transmitting, by the terminal, data to the base station based on the pseudo random sequence. The differential privacy-related information is based on the differential privacy level. The data is transmitted based on the configured resource.

14 Claims, 17 Drawing Sheets

(56) References Cited

U.S. PATENT DOCUMENTS

| | | | | |
|---|---|---|---|---|
| 2023/0060864 | A1* | 3/2023 | Tsou | H04L 9/0866 |
| 2023/0068386 | A1* | 3/2023 | Akdeniz | G06N 20/00 |
| 2024/0372704 | A1* | 11/2024 | Wright | H04L 9/0869 |

FOREIGN PATENT DOCUMENTS

| | | | | |
|---|---|---|---|---|
| CN | 111669366 A | * | 9/2020 | H04L 67/01 |
| JP | 2019-140582 | | 8/2019 | |

OTHER PUBLICATIONS

Koda et al., "Differentially Private AirComp Federated Learning with Power Adaption Harnessing Receiver Noise," CoRR, Submitted on Apr. 14, 2020, arXiv:2004.06337, 8 pages.

Liu et al., "A Secure Federated Learning Framework for 5G Networks," IEEE Wireless Communications, Aug. 18, 2020, 27(4):24-31.

* cited by examiner

DEVICE AND METHOD FOR TRANSMITTING SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2021/095114, filed on Nov. 30, 2021, which claims the benefit of Korean Patent Application No. 10-2020-0165432, filed on Dec. 1, 2020. The disclosures of the prior applications are incorporated by reference in their entirety.

TECHNICAL FIELD

The present disclosure relates to a wireless communication system and, more particularly, to a device and method for transmitting a signal in a wireless communication system.

BACKGROUND ART

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

DISCLOSURE

Technical Problem

The present disclosure may provide a device and method for transmitting a signal in a wireless communication system.

The present disclosure may provide a signal transmission device and method for federated learning in a wireless communication system.

The present disclosure may provide a privacy security method in a wireless communication system based on federated learning.

The technical objects to be achieved in the present disclosure are not limited to the above-mentioned technical objects, and other technical objects that are not mentioned may be considered by those skilled in the art through the embodiments described below.

Technical Solution

As an example of the present disclosure, a method of operating a terminal in a wireless communication system may include receiving, by the terminal, federated learning-related configuration information from a base station, configuring, by the terminal, a resource associated with federated learning based on the federated learning-related configuration information, transmitting, by the terminal, a differential privacy level to the base station, receiving, by the terminal, the differential privacy-related information from the base station, generating, by the terminal, a pseudo random sequence based on the differential privacy-related information, and transmitting, by the terminal, data to the base station based on the pseudo random sequence. The differential privacy-related information is based on the differential privacy level. The data is transmitted based on the configured resource. Herein, other terminals associated with the federated learning may transmit data based on the resource. The federated learning-related configuration information may include information indicating performance of the federated learning. In case the information indicating the performance of the federated learning indicates the performance of the federated learning, the terminal may configure the resource associated with the federated learning. The differential privacy-related information may include information on the number of pseudo random sequences generated by the terminal. The information on the number of the pseudo random sequences may be determined based on a bandwidth of a band matrix. The differential privacy-related information may include information indicating pseudo random sequence information of terminals associated with the federated learning and pseudo random sequence information of the terminal. The terminal may generate the pseudo random sequence based on information indicating the pseudo random sequence of the terminal in the pseudo random sequence information of the terminals associated with the federated learning.

As an example of the present disclosure, a terminal in a wireless communication system may include a transceiver and a processor coupled to the transceiver. The processor controls the transceiver to receive federated learning-related configuration information from a base station. The processor controls to configure a resource associated with federated learning based on the federated learning-related configuration information. The processor controls the transceiver to transmit a differential privacy level to the base station. The processor controls the transceiver to receive the differential privacy-related information from the base station. The processor controls to generate a pseudo random sequence based on the differential privacy-related information. The processor controls the transceiver to transmit data to the base station based on the pseudo random sequence. The differential privacy-related information is based on the differential privacy level. The data is transmitted based on the configured resource. Herein, other terminals associated with the federated learning may transmit data based on the resource. The federated learning-related configuration information may include information indicating performance of the federated learning. In case the information indicating the performance of the federated learning indicates the performance of the federated learning, the terminal may configure the resource associated with the federated learning. The differential privacy-related information may include information on the number of pseudo random sequences generated by the terminal. The information on the number of the pseudo random sequences may be determined based on a bandwidth of a band matrix. The differential privacy-related information may include information indicating pseudo random sequence information of terminals associated with the federated learning and pseudo random sequence information of the terminal. The terminal may generate the pseudo random sequence based on information indicating the pseudo random sequence of the terminal in the pseudo random sequence information of the terminals associated with the federated learning.

As an example of the present disclosure, a communication device may include at least one processor and at least one computer memory coupled to the at least one processor and storing an instruction instructing operations when executed by the at least one processor. The processor controls the communication device to receive federated learning-related configuration information from a base station. The processor controls the communication device to configure a resource associated with federated learning based on the federated learning-related configuration information. The processor controls the communication device to transmit a differential privacy level to the base station. The processor controls the communication device to receive the differential privacy-related information from the base station. The processor controls the communication device to generate a pseudo random sequence based on the differential privacy-related information. The processor controls the communication device to transmit data to the base station based on the pseudo random sequence. The differential privacy-related information is based on the differential privacy level. The data is transmitted based on the configured resource.

As an example of the present disclosure, a non-transitory computer-readable medium storing at least one instruction may include the at least one instruction executable by a processor. The at least one instruction instructs the computer-readable medium to receive federated learning-related configuration information from a base station. The at least one instruction instructs the computer-readable medium to configure a resource associated with federated learning based on the federated learning-related configuration information. The at least one instruction instructs the computer-readable medium to transmit a differential privacy level to the base station. The at least one instruction instructs the computer-readable medium to receive the differential privacy-related information from the base station. The at least one instruction instructs the computer-readable medium to generate a pseudo random sequence based on the differential privacy-related information. The at least one instruction instructs the computer-readable medium to transmit data to the base station based on the pseudo random sequence. The differential privacy-related information is based on the differential privacy level. The data is transmitted based on the configured resource.

As an example of the present disclosure, a method of operating a base station in a wireless communication system includes transmitting, by the base station, federated learning-related configuration information to a terminal, receiving, by the base station, a differential privacy level from the terminal, transmitting, by the base station, the differential privacy-related information to the terminal, and receiving, by the base station, data based on the pseudo random sequence from the terminal. The differential privacy-related information is based on the differential privacy level. The pseudo random sequence is generated based on the differential privacy-related information. A resource associated with federated learning is configured based on federated learning-related configuration information. Data is transmitted based on the configured resource.

As an example of the present disclosure, a base station in a wireless communication system includes a transceiver and a processor coupled to the transceiver. The processor controls the transceiver to transmit federated learning-related configuration information. The processor controls the transceiver to receive a differential privacy level from the terminal. The processor controls the transceiver to transmit the differential privacy-related information to the terminal. The processor controls the transceiver to receive data based on the pseudo random sequence from the terminal. The differential privacy-related information is based on the differential privacy level. The pseudo random sequence is generated based on the differential privacy-related information. A resource associated with federated learning is configured based on federated learning-related configuration information. The data is transmitted based on the configured resource.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

Advantageous Effects

As is apparent from the above description, the embodiments of the present disclosure have the following effects.

According to the present disclosure, since a base station and a terminal perform federated learning, overhead may be reduced when the base station and the terminal transmit data.

According to the present disclosure, when a terminal communicates with abase station, privacy may be secured with respect to physical layer security.

According to the present disclosure, privacy may be secured in federated learning based on air-computation.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

DESCRIPTION OF DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

MODE FOR INVENTION

Figure 1:
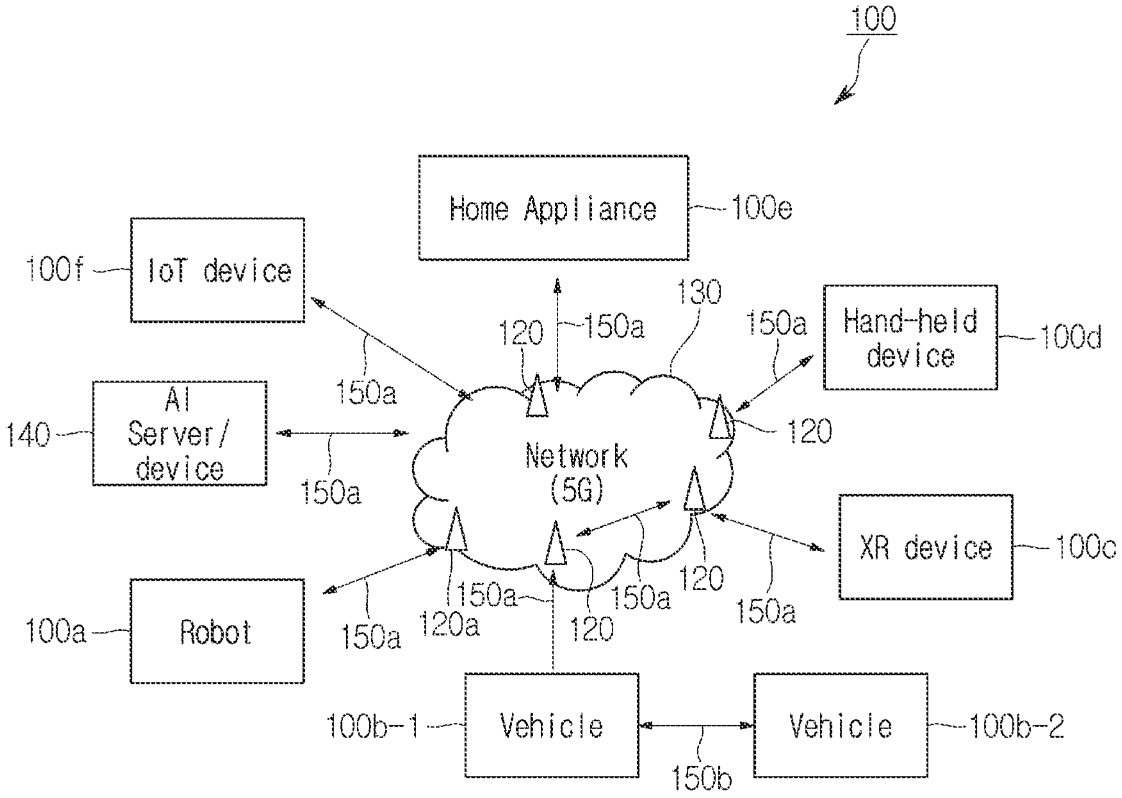
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS. various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an artificial intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an unmanned aerial vehicle (UAV) (e.g., a drone). The XR device 100*c* includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120 and the network 130 may be implemented by a wireless device, and a specific wireless device 120*a* may operate as a base station/network node for another wireless device.

The wireless devices 100*a* to 100*f* may be connected to the network 130 through the base station 120. AI technology is applicable to the wireless devices 100*a* to 100*f*, and the wireless devices 100*a* to 100*f* may be connected to the AI server 100*g* through the network 130. The network 130 may be configured using a 3G network, a 4G (e.g., LTE) network or a 5G (e.g., NR) network, etc. The wireless devices 100*a* to 100*f* may communicate with each other through the base station 120/the network 130 or perform direct communication (e.g., sidelink communication) without through the base station 120/the network 130. For example, the vehicles 100*b*-1 and 100*b*-2 may perform direct communication (e.g., vehicle to vehicle (V2V)/vehicle to everything (V2X) communication). In addition, the IoT device 100*f* (e.g., a sensor) may perform direct communication with another IoT device (e.g., a sensor) or the other wireless devices 100*a* to 100*f*.

Wireless communications/connections 150*a*, 150*b* and 150*c* may be established between the wireless devices 100*a* to 100*f*/the base station 120 and the base station 120/the base station 120. Here, wireless communication/connection may be established through various radio access technologies (e.g., 5G NR) such as uplink/downlink communication 150*a*, sidelink communication 150*b* (or D2D communication) or communication 150*c* between base stations (e.g., relay, integrated access backhaul (IAB). The wireless device and the base station/wireless device or the base station and the base station may transmit/receive radio signals to/from each other through wireless communication/connection 150*a*. 150*b* and 150*c*. For example, wireless communication/connection 150*a*, 150*b* and 150*c* may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
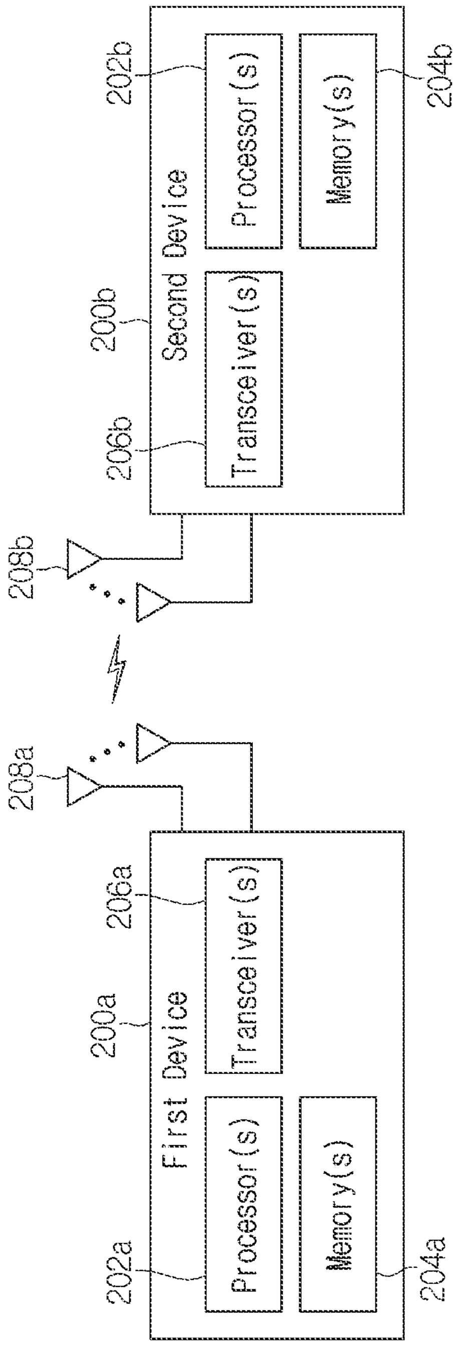
FIG. 2 is a view showing an example of a wireless apparatus applicable to the present disclosure.

FIG. 2 is a view showing an example of a wireless device applicable to the present disclosure.

Referring to FIG. 2, a first wireless device 200*a* and a second wireless device 200*b* may transmit and receive radio signals through various radio access technologies (e.g., LTE or NR). Here, {the first wireless device 200*a*, the second wireless device 200*b*} may correspond to {the wireless device 100*x*, the base station 120} and/or {the wireless device 100*x*, the wireless device 100*x*} of FIG. 1.

The first wireless device 200*a* may include one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement descriptions, functions, procedures, proposals, methods and/or operational flowcharts disclosed herein. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and then store information obtained from signal processing of the second information/signal in the memory 204*a*. The memory 204*a* may be coupled with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be coupled with the processor 202*a* to transmit and/or receive radio signals through one or more antennas 208*a*. The transceiver 206*a* may include a transmitter and/or a receiver. The transceiver 206*a* may be used interchangeably with a radio frequency (RF) unit. In the present disclosure, the wireless device may refer to a communication modem/circuit/chip.

The second wireless device 200*b* may include one or more processors 202*b* and one or more memories 204*b* and may further include one or more transceivers 206*b* and/or one or more antennas 208*b*. The processor 202*b* may be configured to control the memory 204*b* and/or the transceiver 206*b* and to implement the descriptions, functions, procedures, proposals, methods and/or operational flowcharts disclosed herein. For example, the processor 202*b* may process information in the memory 204*b* to generate third information/signal and then transmit the third information/signal through the transceiver 206*b*. In addition, the processor 202*b* may receive a radio signal including fourth information/signal through the transceiver 206*b* and then store information obtained from signal processing of the fourth information/signal in the memory 204*b*. The memory 204*b* may be coupled with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g.. LTE or NR). The transceiver 206*b* may be coupled with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be coupled with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be coupled with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be coupled with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be coupled with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Structure of Wireless Device Applicable to the Present Disclosure

Figure 3:
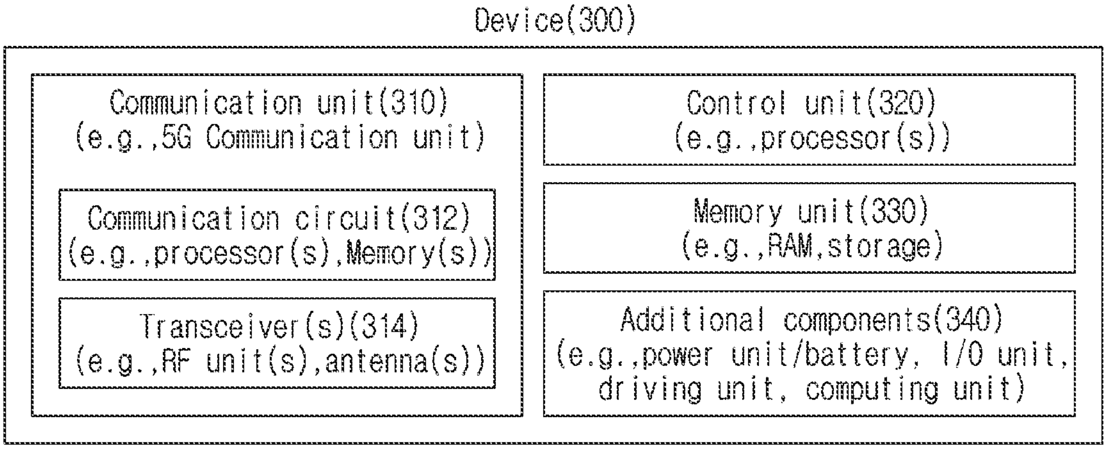
FIG. 3 is a view showing another example of a wireless device applicable to the present disclosure.

FIG. 3 is a view showing another example of a wireless device applicable to the present disclosure.

Referring to FIG. 3, a wireless device 300 may correspond to the wireless devices 200*a* and 200*b* of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202*a* and 202*b* and/or one or more memories 204*a* and 204*b* of FIG. 2. For example, the transceiver(s) 314 may include one or more transceivers 206*a* and 206*b* and/or one or more antennas 208*a* and 208*b* of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100*a*), the vehicles (FIG. 1, 100*b*-1 and 100*b*-2), the XR device (FIG. 1, 100*c*), the hand-held device (FIG. 1, 100*d*), the home appliance (FIG. 1, 100*e*), the IoT device (FIG. 1, 100*f*), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 4:
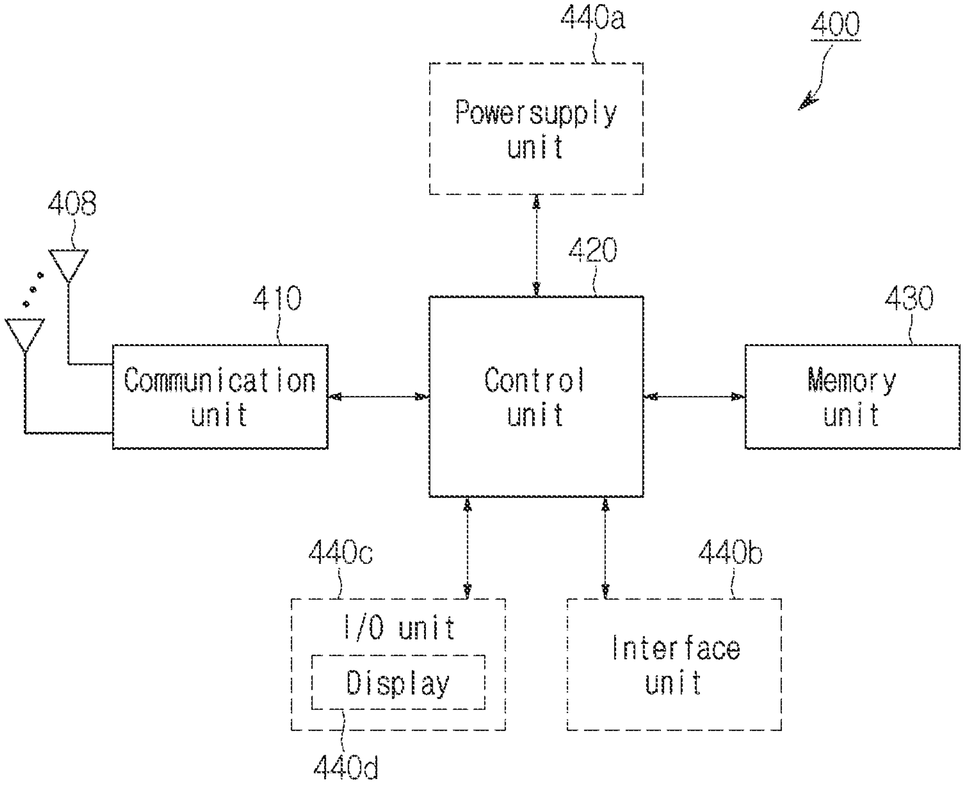
FIG. 4 is a view showing an example of a hand-held device applicable to the present disclosure.

FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440*a*, an interface unit (interface) 440*b*, and an input/output unit 440*c*. An antenna unit (antenna) 408 may be part of the communication unit 410. The blocks 410 to 430/440*a* to 440*c* may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440*a* may supply power to the hand-held device 400 and include a wired/wireless charging circuit, a battery, etc. The interface unit 440*b* may support connection between the hand-held device 400 and another external device. The interface unit 440*b* may include various ports (e.g., an audio input/output port and a video input/output port) for connection with the external device. The input/output unit 440*c* may receive or output video information/signals, audio information/signals, data and/or user input information. The input/output unit 440*c* may include a camera, a microphone, a user input unit, a display 440*d*, a speaker and/or a haptic module.

For example, in case of data communication, the input/output unit 440*c* may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440*c* in various forms (e.g., text, voice, image, video and haptic).

Type of Wireless Device Applicable to the Present Disclosure

Figure 5:
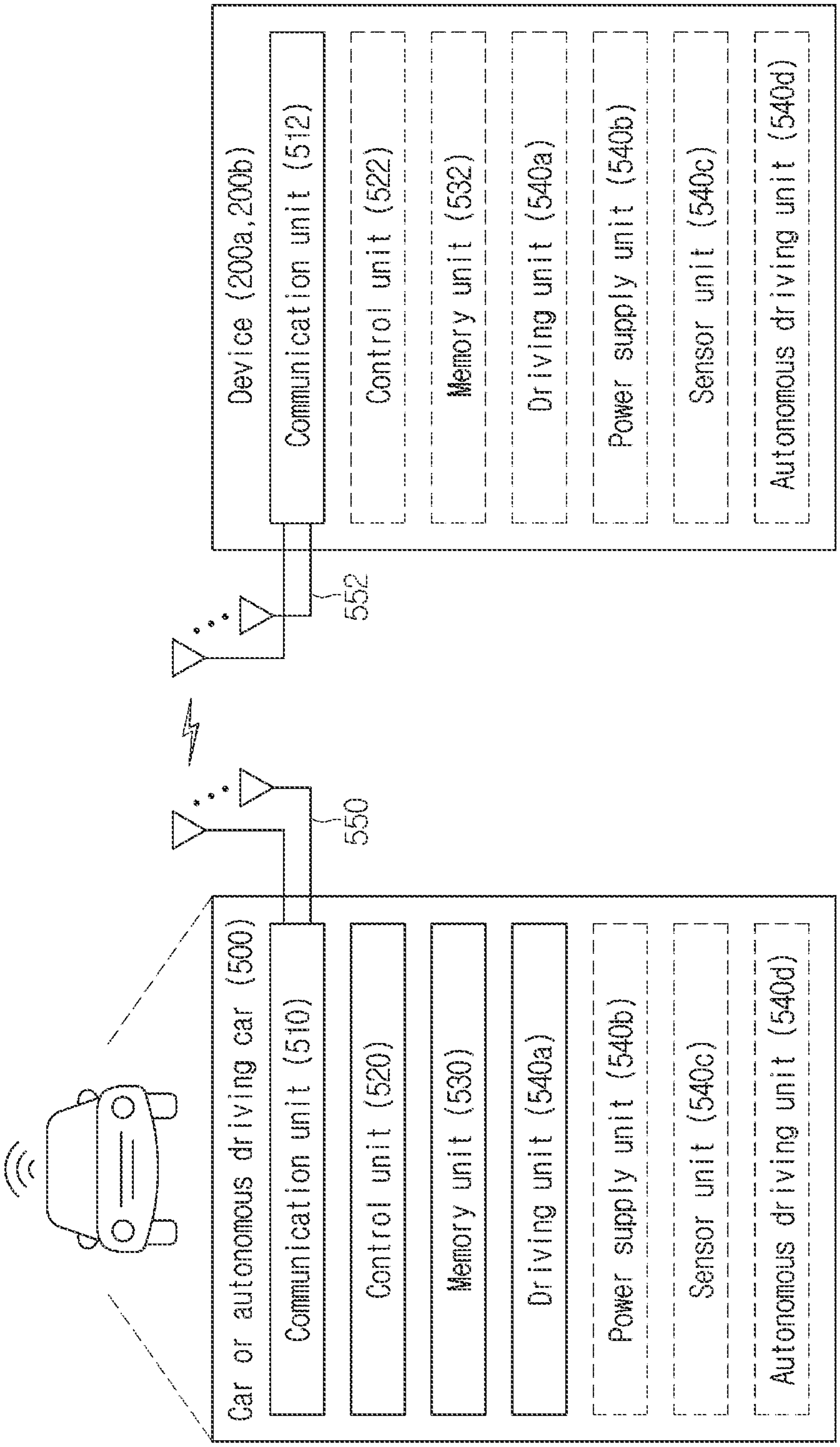
FIG. 5 is a view showing an example of a car or an autonomous driving car applicable to the present disclosure.

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540*a*, a power supply unit (power supply) 540*b*, a sensor unit 540*c*, and an autonomous driving unit 540*d*. The antenna unit 550 may be configured as part of the communication unit 510. The blocks 510/530/540*a* to 540*d* correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU).

Figure 6:
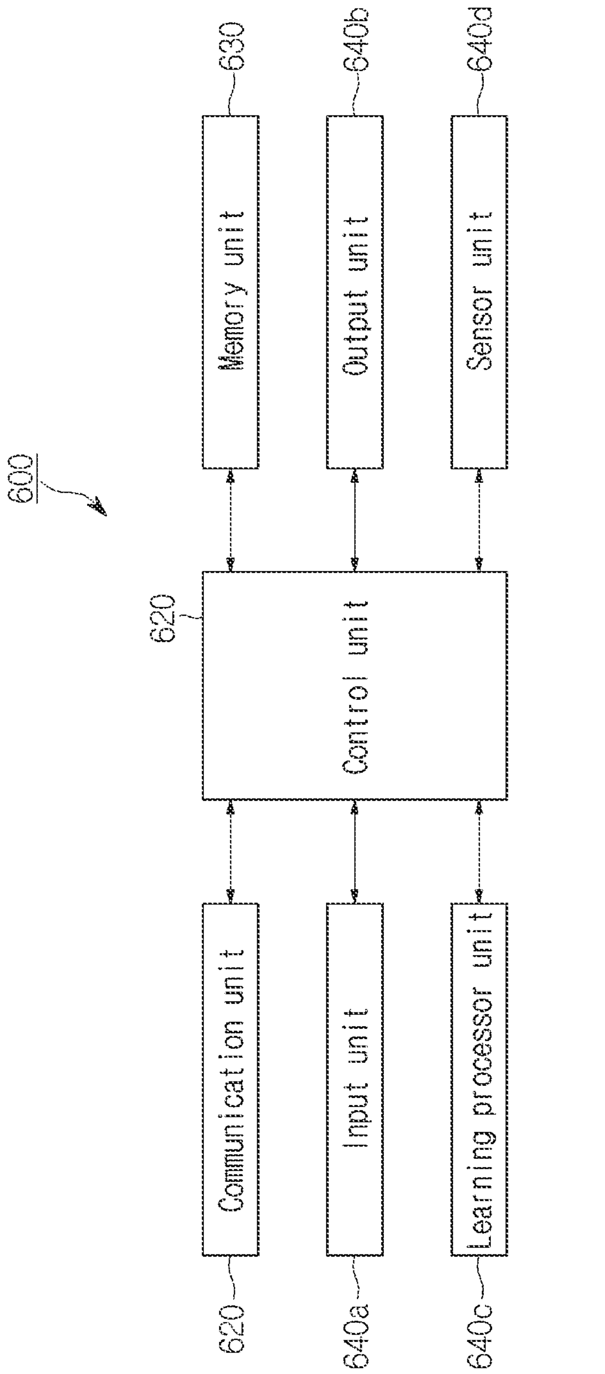
FIG. 6 is a diagram illustrating an example of an AI device applied to the present disclosure.

FIG. 6 is a diagram illustrating an example of an AI device applied to the present disclosure. For example, the AI device may be implemented as a fixed device or a movable device such as TV, projector, smartphone, PC, laptop, digital broadcasting terminal, tablet PC, wearable device, set-top box (STB), radio, washing machine, refrigerator, digital signage, robot, vehicle, etc.

Referring to FIG. 6, the AI device 600 may include a communication unit 610, a control unit 620, a memory unit 630, an input/output unit 640*a*/640*b*, a learning processor unit 640*c* and a sensor unit 640*d*. Blocks 610 to 630/640A to 640D may correspond to blocks 310 to 330/340 of FIG. 3, respectively.

The communication unit 610 may transmit and receive a wired and wireless signal (e.g., sensor information, user input, learning model, control signal, etc.) to and from external devices such as another AI device (e.g., 100*x*, 120, 140 in FIG. 1) or an AI server (140 in FIG. 1) using wired/wireless communication technology. To this end, the communication unit 610 may transmit information in the memory unit 630 to an external device or send a signal received from an external device to the memory unit 630.

The control unit 620 may determine at least one executable operation of the AI device 600 based on information determined or generated using a data analysis algorithm or machine learning algorithm. In addition, the control unit 620 may control the components of the AI device 600 to perform the determined operation. For example, the control unit 620 may request, search, receive, or utilize the data of the learning processor 640*c* or the memory unit 630, and control the components of the AI device 600 to perform predicted operation or operation determined to be preferred among at least one executable operation. In addition, the control unit 620 collects history information including a user's feedback on the operation content or operation of the AI device 600, and stores it in the memory unit 630 or the learning processor 640*c* or transmit it to an external device such as the AI server (140 in FIG. 1). The collected history information may be used to update a learning model.

The memory unit 630 may store data supporting various functions of the AI device 600. For example, the memory unit 630 may store data obtained from the input unit 640*a*, data obtained from the communication unit 610, output data of the learning processor unit 640*c*, and data obtained from the sensor unit 640. Also, the memory unit 630 may store control information and/or software code required for operation/execution of the control unit 620.

The input unit 640*a* may obtain various types of data from the outside of the AI device 600. For example, the input unit 620 may obtain learning data for model learning, input data to which the learning model is applied, etc. The input unit 640*a* may include a camera, a microphone and/or a user input unit, etc. The output unit 640*b* may generate audio, video or tactile output. The output unit 640*b* may include a display unit, a speaker and/or a haptic module. The sensor unit 640 may obtain at least one of internal information of the AI device 600, surrounding environment information of the AI device 600 or user information using various sensors. The sensor unit 640 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar.

The learning processor unit 640*c* may train a model composed of an artificial neural network using learning data. The learning processor unit 640*c* may perform AI processing together with the learning processor unit of the AI server (140 in FIG. 1). The learning processor unit 640*c* may process information received from an external device through the communication unit 610 and/or information stored in the memory unit 630. In addition, the output value of the learning processor unit 640*c* may be transmitted to an external device through the communication unit 610 and/or stored in the memory unit 630.

Figure 7:
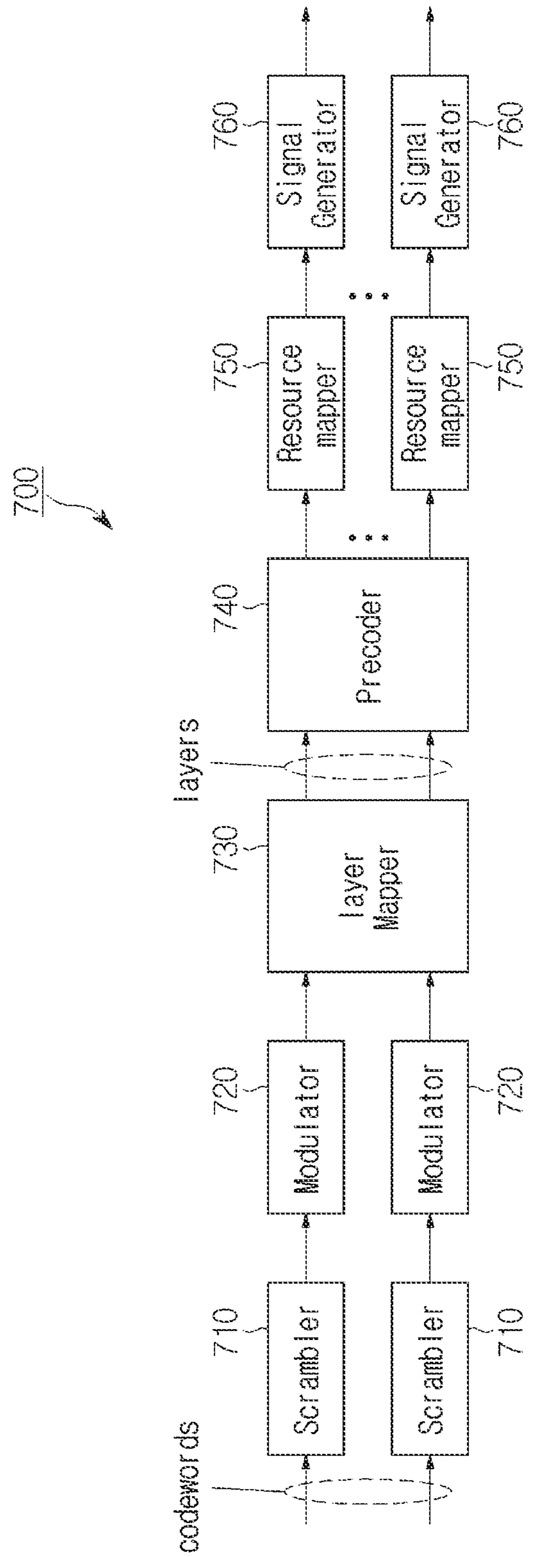
FIG. 7 is a diagram illustrating a method of processing a transmitted signal applied to the present disclosure.

FIG. 7 is a diagram illustrating a method of processing a transmitted signal applied to the present disclosure. For example, the transmitted signal may be processed by a signal processing circuit. In this case, the signal processing circuit 700 may include a scrambler 710, a modulator 720, a layer mapper 730, a precoder 740, a resource mapper 750, and a signal generator 760. At this time, as an example, the operation/function of FIG. 7 may be performed by the processors 202*a* and 202*b* and/or the transceivers 206*a* and 206*b* of FIG. 2. Also, as an example, the hardware elements of FIG. 7 may be implemented in the processors 202*a* and 202*b* and/or the transceivers 206*a* and 206*b* of FIG. 2. As an example, blocks 710 to 760 may be implemented in the processors 202*a* and 202*b* of FIG. 2. Also, blocks 710 to 750 may be implemented in the processors 202*a* and 202*b* of FIG. 2, and block 760 may be implemented in the transceivers 206*a* and 206*b* of FIG. 2, and are not limited to the above-described embodiment.

A codeword may be converted into a radio signal through the signal processing circuit 700 of FIG. 7. Here, the codeword is an encoded bit sequence of an information block. Information blocks may include transport blocks (e.g., UL-SCH transport blocks, DL-SCH transport blocks). The radio signal may be transmitted through various physical channels (e.g., PUSCH, PDSCH). Specifically, the codeword may be converted into a scrambled bit sequence by the scrambler 710. A scramble sequence used for scrambling is generated based on an initialization value, and the initialization value may include ID information of a wireless device. The scrambled bit sequence may be modulated into a modulation symbol sequence by the modulator 720. The modulation method may include pi/2-binary phase shift keying (pi/2-BPSK), m-phase shift keying (m-PSK), m-quadrature amplitude modulation (m-QAM), and the like.

A complex modulation symbol sequence may be mapped to one or more transport layers by the layer mapper 730. Modulation symbols of each transport layer may be mapped to corresponding antenna port(s) by the precoder 740 (precoding). The output z of the precoder 740 may be obtained by multiplying the output y of the layer mapper 730 by a N*M precoding matrix W. Here, N is the number of antenna ports and M is the number of transport layers. Here, the precoder 740 may perform precoding after transform precoding (e.g., discrete Fourier transform (DFT)) on complex modulation symbols. Also, the precoder 740 may perform precoding without performing transform precoding.

The resource mapper 750 may map modulation symbols of each antenna port to time-frequency resources. The time-frequency resources may include a plurality of symbols (e.g.. CP-OFDMA symbols and DFT-s-OFDMA symbols) in the time domain and may include a plurality of subcarriers in the frequency domain. The signal generator 760 generates a radio signal from the mapped modulation symbols, and the generated radio signal may be transmitted to other devices through each antenna. To this end, the signal generator 760 may include an inverse fast Fourier transform (IFFT) module, a cyclic prefix (CP) inserter, a digital-to-analog converter (DAC), a frequency uplink converter, and the like.

A signal processing process for a received signal in a wireless device may be configured as the reverse of the signal processing processes 710 to 760 of FIG. 7. For example, a wireless device (e.g., 200*a* and 200*b* of FIG. 2) may receive a radio signal from the outside through an antenna port/transceiver. The received radio signal may be converted into a baseband signal through a signal reconstructor. To this end, the signal reconstructor may include a frequency downlink converter, an analog-to-digital converter (ADC), a CP remover, and a fast Fourier transform (FFT) module. Thereafter, the baseband signal may be reconstructed to a codeword through a resource de-mapper process, a postcoding process, a demodulation process, and a de-scramble process. The codeword may be reconstructed to an original information block through decoding. Accordingly, a signal processing circuit (not shown) for a received signal may include a signal reconstructor, a resource demapper, a postcoder, a demodulator, a de-scrambler, and a decoder.

Core Implementation Technology of 6G System

Artificial Intelligence (AI)

The most important and newly introduced technology for the 6G system is AI. AI was not involved in the 4G system. 5G systems will support partial or very limited AI. However, the 6G system will support AI for full automation. Advances in machine learning will create more intelligent networks for real-time communication in 6G. Introducing AI in communication may simplify and enhance real-time data transmission. AI may use a number of analytics to determine how complex target tasks are performed. In other words, AI may increase efficiency and reduce processing delay.

Time consuming tasks such as handover, network selection, and resource scheduling may be performed instantly by using AI. AI may also play an important role in machine-to-machine, machine-to-human and human-to-machine communication. In addition, AI may be a rapid communication in a brain computer interface (BCI). AI-based communication systems may be supported by metamaterials, intelligent structures, intelligent networks, intelligent devices, intelligent cognitive radios, self-sustained wireless networks, and machine learning.

Recently, attempts have been made to integrate AI with wireless communication systems, but application layers, network layers, and in particular, deep learning have been focused on the field of wireless resource management and allocation. However, such research is gradually developing into the MAC layer and the physical layer, and in particular, attempts to combine deep learning with wireless transmission are appearing in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based multiple input multiple output (MIMO) mechanism, and AI-based resource scheduling and allocation may be included.

Machine learning may be used for channel estimation and channel tracking, and may be used for power allocation, interference cancellation, and the like in a downlink (DL) physical layer. Machine learning may also be used for antenna selection, power control, symbol detection, and the like in a MIMO system.

However, the application of DNN for transmission in the physical layer may have the following problems.

Deep learning-based AI algorithms require a lot of training data to optimize training parameters. However, due to limitations in obtaining data in a specific channel environment as training data, a lot of training data is used offline. This is because static training on training data in a specific channel environment may cause a contradiction between diversity and dynamic characteristics of a radio channel.

In addition, current deep learning mainly targets real signals. However, the signals of the physical layer of wireless communication are complex signals. In order to match the characteristics of a wireless communication signal, additional research on a neural network that detects a complex domain signal is required.

Hereinafter, machine learning will be described in greater detail.

Machine learning refers to a series of operations for training a machine to create a machine capable of performing a task which can be performed or is difficult to be performed by a person. Machine learning requires data and a learning model. In machine learning, data learning methods may be largely classified into three types: supervised learning, unsupervised learning, and reinforcement learning.

Neural network learning is to minimize errors in output. Neural network learning is a process of updating the weight of each node in the neural network by repeatedly inputting learning data to a neural network, calculating the output of the neural network for the learning data and the error of the target, and backpropagating the error of the neural network from the output layer of the neural network to the input layer in a direction to reduce the error.

Supervised learning uses learning data labeled with correct answers in the learning data, and unsupervised learning may not have correct answers labeled with the learning data. That is, for example, learning data in the case of supervised learning related to data classification may be data in which each learning data is labeled with a category. Labeled learning data is input to the neural network, and an error may be calculated by comparing the output (category) of the neural network and the label of the learning data. The calculated error is backpropagated in a reverse direction (i.e., from the output layer to the input layer) in the neural network, and the connection weight of each node of each layer of the neural network may be updated according to backpropagation. The amount of change in the connection weight of each updated node may be determined according to a learning rate. The neural network's computation of input data and backpropagation of errors may constitute a learning cycle (epoch). The learning rate may be applied differently according to the number of iterations of the learning cycle of the neural network. For example, in the early stages of neural network learning, a high learning rate is used to allow the neural network to quickly achieve a certain level of performance to increase efficiency, and in the late stage of learning, a low learning rate may be used to increase accuracy.

A learning method may vary according to characteristics of data. For example, when the purpose is to accurately predict data transmitted from a transmitter in a communication system by a receiver, it is preferable to perform learning using supervised learning rather than unsupervised learning or reinforcement learning.

The learning model corresponds to the human brain, and although the most basic linear model may be considered, a paradigm of machine learning that uses a neural network structure with high complexity such as artificial neural networks as a learning model is referred to as deep learning.

The neural network cord used in the learning method is largely classified into deep neural networks (DNN), convolutional deep neural networks (CNN), and recurrent Boltzmann machine (RNN), and this learning model may be applied.

Artificial Intelligence System

Figure 8:
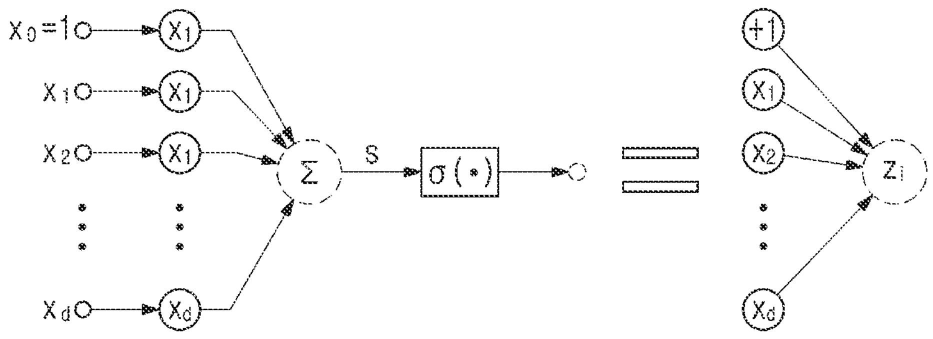
FIG. 8 illustrates a structure of a perceptron included in an artificial neural network applicable to the present disclosure.
Figure 9:
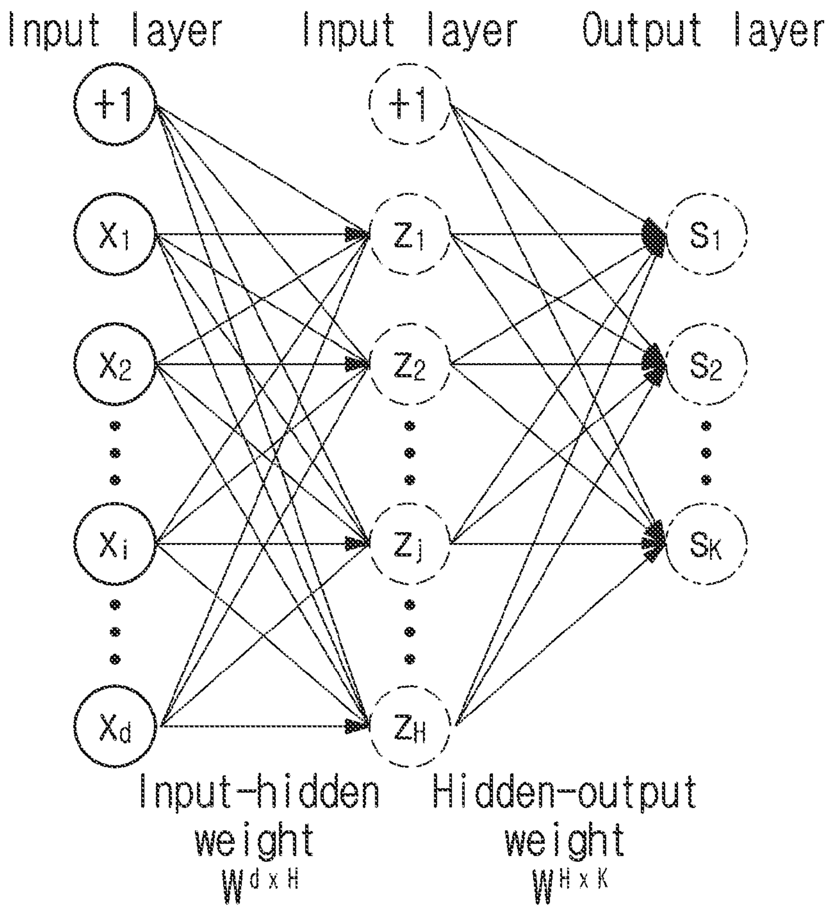
FIG. 9 illustrates an artificial neural network structure applicable to the present disclosure.

FIG. 8 illustrates a structure of a perceptron included in an artificial neural network applicable to the present disclosure. FIG. 9 illustrates an artificial neural network structure applicable to the present disclosure.

As described above, an artificial intelligence system may be applied to a 6G system. Herein, as an example, the artificial intelligence system may operate based on a learning model corresponding to the human brain, as described above. Herein, a paradigm of machine learning, which uses a neural network architecture with high complexity like artificial neural network, may be referred to as deep learning. In addition, neural network cores, which are used as a learning scheme, are mainly a deep neural network (DNN), a convolutional deep neural network (CNN), and a recurrent neural network (RNN). Herein, as an example referring to FIG. 8, an artificial neural network may consist of a plurality of perceptrons. Herein, when an input vector x={x1, x2, . . . , xd} is input, each component is multiplied by a weight {W1, W2, . . . , Wd}, results are all added up, and then an activation function σ( ) is applied, of which the overall process may be referred to as a perceptron. For a large artificial neural network architecture, when expanding the simplified perceptron structure illustrated in FIG. 8, an input may be applied to different multidimensional perceptrons. For convenience of explanation, an input value or an output value will be referred to as a node.

Meanwhile, the perceptron structure illustrated in FIG. 8 may be described to consist of a total of 3 layers based on an input value and an output value. An artificial neural network, which has H (d+1)-dimensional perceptrons between a 1st layer and a 2nd layer and K (H+1)-dimensional perceptrons between the 2nd layer and a 3rd layer, may be expressed as in FIG. 9.

Herein, a layer, in which an input vector is located, is referred to as an input layer, a layer, in which a final output value is located, is referred to as an output layer, and all the layers between the input layer and the output layer are referred to as hidden layers. As an example, 3 layers are disclosed in FIG. 9, but since an input layer is excluding in counting the number of actual artificial neural network layers, it can be understood that the artificial neural network illustrated in FIG. 9 has a total of 2 layers. An artificial neural network is constructed by connecting perceptrons of a basic block two-dimensionally.

The above-described input layer, hidden layer and output layer are commonly applicable not only to multilayer perceptrons but also to various artificial neural network architectures like CNN and RNN, which will be described below. As there are more hidden layers, an artificial neural network becomes deeper, and a machine learning paradigm using a sufficiently deep artificial neural network as a learning model may be referred to as deep learning. In addition, an artificial neural network used for deep learning may be referred to as a deep neural network (DNN).

Figure 10:
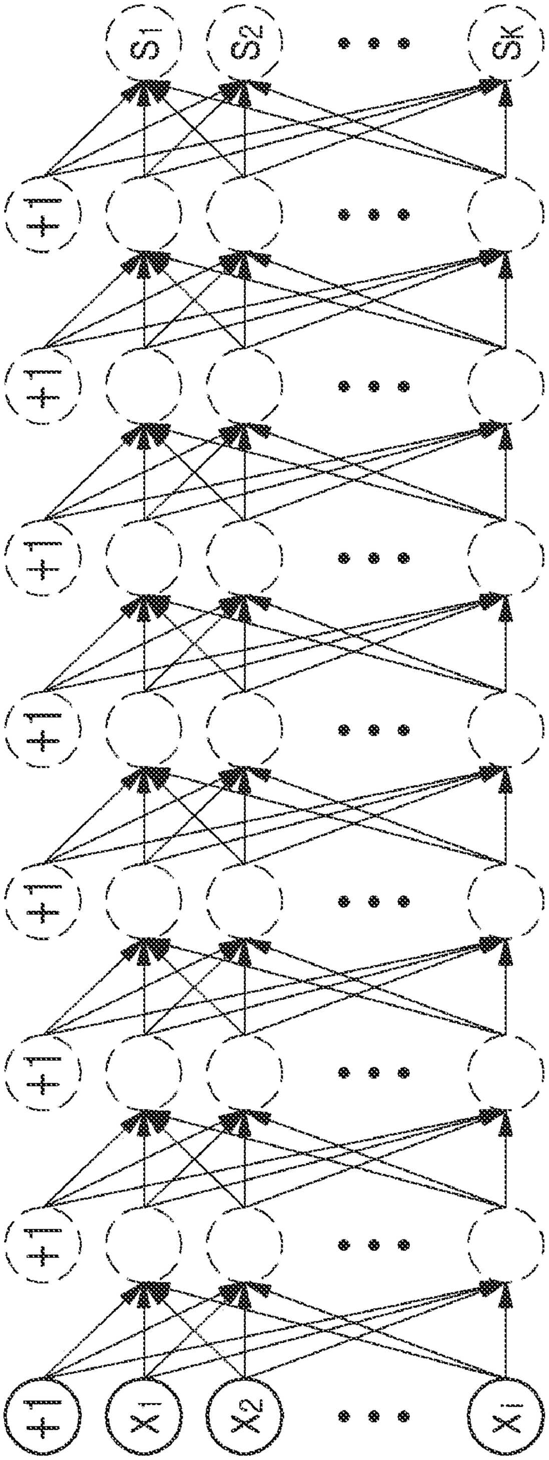
FIG. 10 illustrates a deep neural network applicable to the present disclosure.

FIG. 10 illustrates a deep neural network applicable to the present disclosure.

Referring to FIG. 10, a deep neural network may be a multilayer perceptron consisting of 8 layers (hidden layers+output layer). Herein, the multilayer perceptron structure may be expressed as a fully-connected neural network. In a fully-connected neural network, there may be no connection between nodes in a same layer and only nodes located in neighboring layers may be connected with each other. A DNN has a fully-connected neural network structure combining a plurality of hidden layers and activation functions so that it may be effectively applied for identifying a correlation characteristic between an input and an output. Herein, the correlation characteristic may mean a joint probability between the input and the output.

Figure 11:
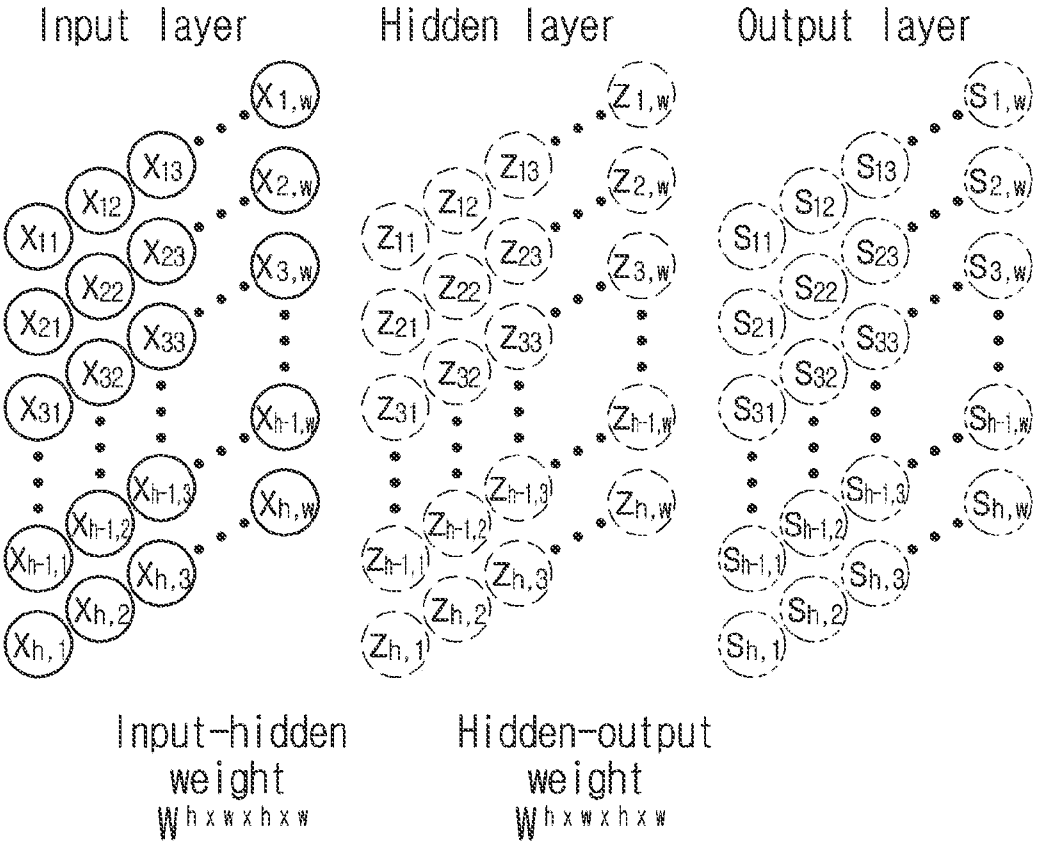
FIG. 11 illustrates a convolutional neural network applicable to the present disclosure.
Figure 12:
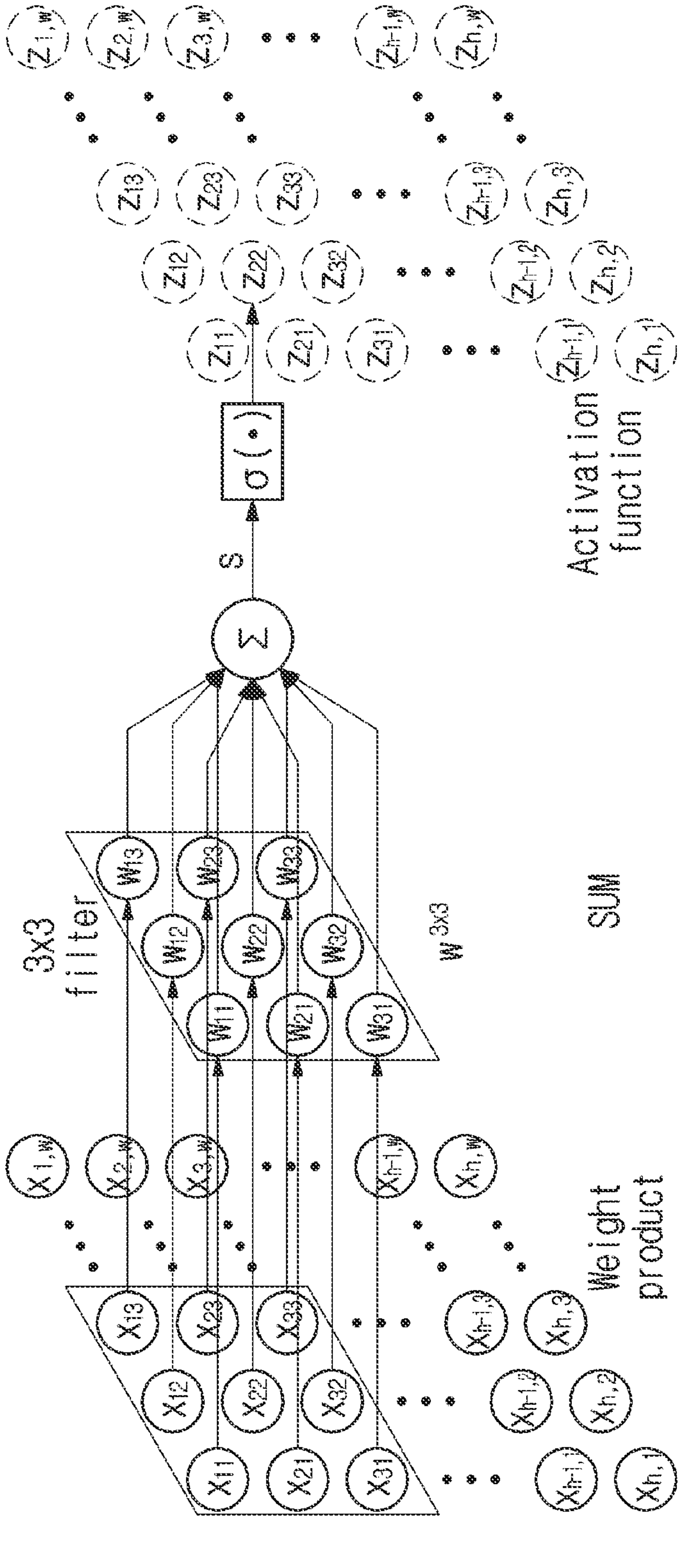
FIG. 12 illustrates a filter operation of a convolutional neural network applicable to the present disclosure.

FIG. 11 illustrates a convolutional neural network applicable to the present disclosure. In addition, FIG. 12 illustrates a filter operation of a convolutional neural network applicable to the present disclosure.

As an example, depending on how to connect a plurality of perceptrons, it is possible to form various artificial neural network structures different from the above-described DNN. Herein, in the DNN, nodes located in a single layer are arranged in a one-dimensional vertical direction. However, referring to FIG. 11, it is possible to assume a two-dimensional array of w horizontal nodes and h vertical nodes (the convolutional neural network structures of FIG. 11). In this case, since a weight is applied to each connection in a process of connecting one input node to a hidden layer, a total of h×w weights should be considered. As there are h×w nodes in an input layer a total of h2w2 weights may be needed between two neighboring layers.

Furthermore, as the convolutional neural network of FIG. 11 has the problem of exponential increase in the number of weights according to the number of connections, the presence of a small filter may be assumed instead of considering every mode of connections between neighboring layers. As an example, as shown in FIG. 12, weighted summation and activation function operation may be enabled for a portion overlapped by a filter.

At this time, one filter has a weight corresponding to a number as large as its size, and learning of a weight may be performed to extract and output a specific feature on an image as a factor. In FIG. 12, a 3×3 filter may be applied to a top rightmost 3×3 area of an input layer, and an output value, which is a result of the weighted summation and activation function operation for a corresponding node, may be stored at z22.

Herein, as the above-described filter scans the input layer while moving at a predetermined interval horizontally and vertically, a corresponding output value may be put a position of a current filter. Since a computation method is similar to a convolution computation for an image in the field of computer vision, such a structure of deep neural network may be referred to as a convolutional neural network (CNN), and a hidden layer created as a result of convolution computation may be referred to as a convolutional layer. In addition, a neural network with a plurality of convolutional layers may be referred to as a deep convolutional neural network (DCNN).

In addition, at a node in which a current filter is located in a convolutional layer, a weighted sum is calculated by including only a node in an area covered by the filter and thus the number of weights may be reduced. Accordingly, one filter may be so used as to focus on a feature of a local area. Thus, a CNN may be effectively applied to image data processing for which a physical distance in a two-dimensional area is a crucial criterion of determination. Meanwhile, a CNN may apply a plurality of filters immediately before a convolutional layer and create a plurality of output results through a convolution computation of each filter.

Meanwhile, depending on data properties, there may be data of which a sequence feature is important. A recurrent neural network structure may be a structure obtained by applying a scheme, in which elements in a data sequence are input one by one at each timestep by considering the distance variability and order of such sequence datasets and an output vector (hidden vector) output at a specific timestep is input with a very next element in the sequence, to an artificial neural network.

Figure 13:
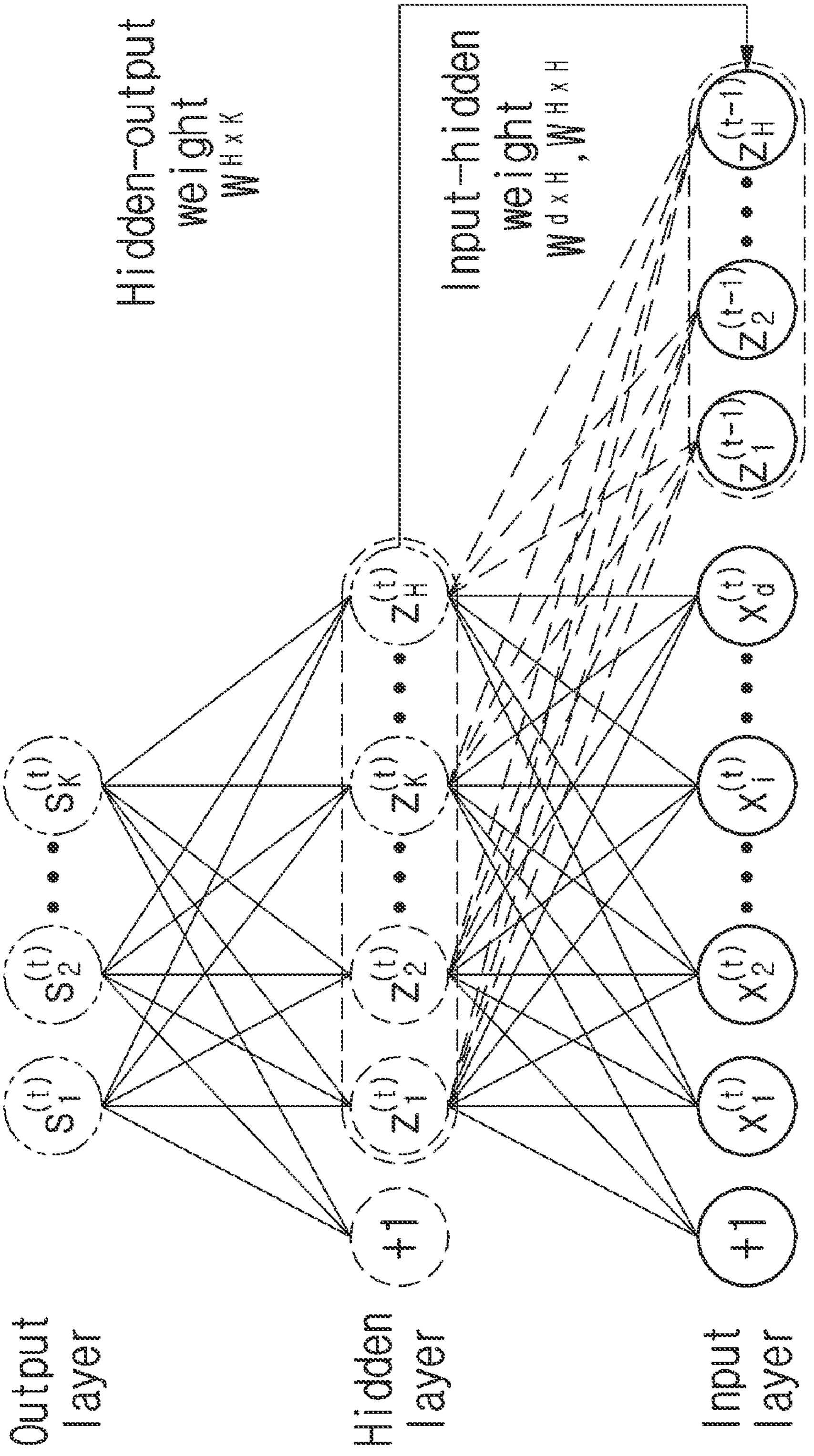
FIG. 13 illustrates a neural network architecture with a recurrent loop applicable to the present disclosure.
Figure 14:
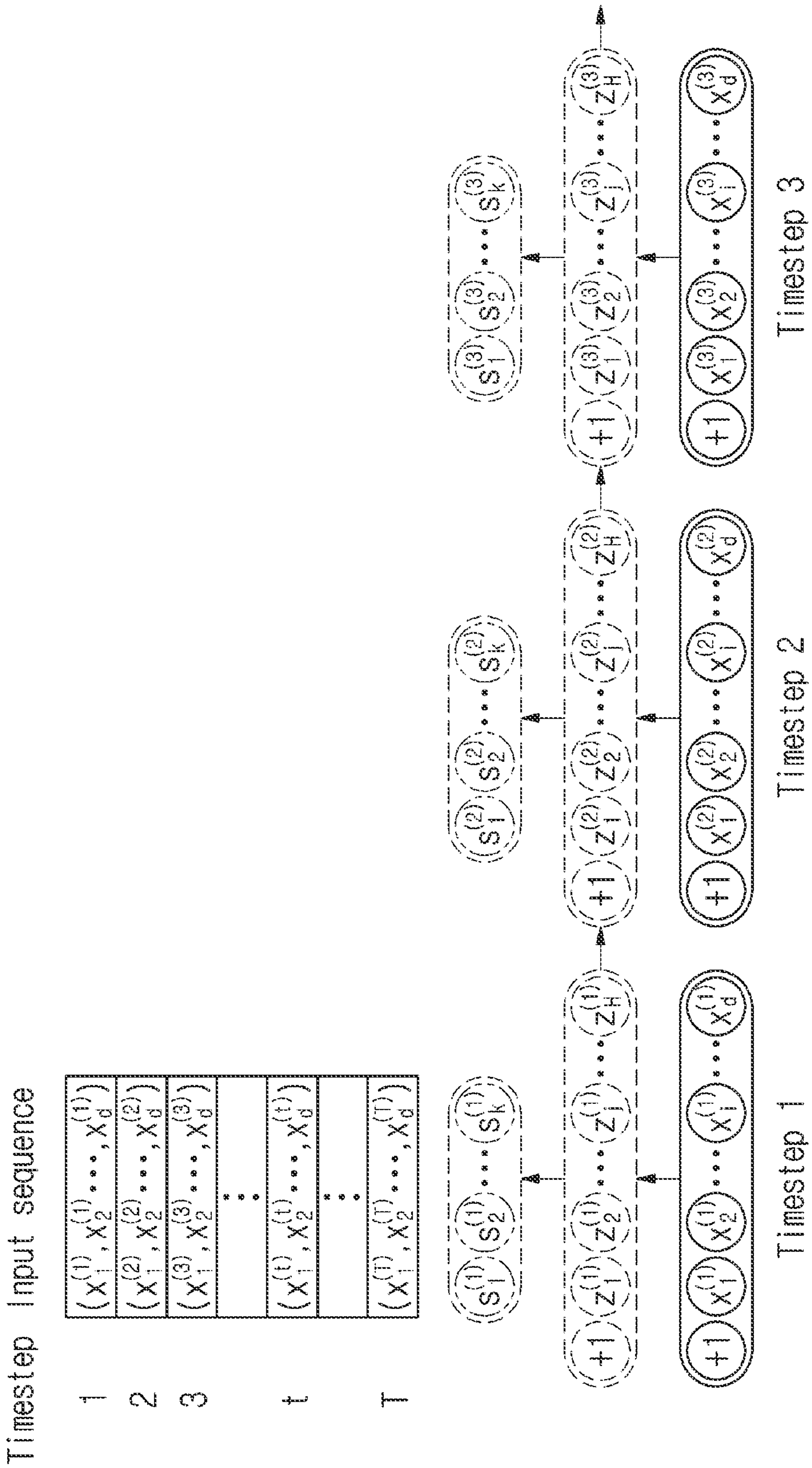
FIG. 14 illustrates an operational structure of a recurrent neural network applicable to the present disclosure.

FIG. 13 illustrates a neural network architecture with a recurrent loop applicable to the present disclosure. FIG. 14 illustrates an operational structure of a recurrent neural network applicable to the present disclosure.

Referring to FIG. 13, a recurrent neural network (RNN) may have a structure which applies a weighted sum and an activation function by inputting hidden vectors $\{z_1^{(t-1)}, z_2^{(t-1)}, \ldots, z_H^{(t-1)}\}$ of an immediately previous timestep t−1 during a process of inputting elements $\{x_1^{(t)}, x_2^{(t)}, \ldots, x_d^{(t)}\}$ of a timestep t in a data sequence into a fully connected neural network. The reason why such hidden vectors are forwarded to a next timestep is because information in input vectors at previous timesteps is considered to have been accumulated in a hidden vector of a current timestep.

In addition, referring to FIG. 14, a recurrent neural network may operate in a predetermined timestep order for an input data sequence. Herein, as a hidden vector $\{z_1^{(1)}, z_2^{(1)}, \ldots, z_H^{(1)}\}$ at a time of inputting an input vector $\{x_1^{(t)}, x_2^{(t)}, x_d^{(t)}\}$ of timestep 1 into a recurrent neural network is input together with an input vector $\{x_1^{(2)}, x_2^{(2)}, \ldots, x_d^{(2)}\}$ of timestep 2, a vector $\{z_1^{(2)}, z_2^{(2)}, \ldots, z_H^{(2)}\}$ of a hidden layer is determined through a weighted sum and an activation function. Such a process is iteratively performed at timestep 2, timestep 3 and until timestep T.

Meanwhile, when a plurality of hidden layers are allocated in a recurrent neural network, this is referred to as a deep recurrent neural network (DRNN). A recurrent neural network is so designed as to effectively apply to sequence data (e.g., natural language processing).

Apart from DNN, CNN and RNN, other neural network cores used as a learning scheme include various deep learning techniques like restricted Boltzmann machine (RBM), deep belief networks (DBN) and deep Q-Network, and these may be applied to such areas as computer vision, voice recognition, natural language processing, and voice/signal processing.

Recently, there are attempts to integrate AI with a wireless communication system, but these are concentrated in an application layer and a network layer and, especially in the case of deep learning, in a wireless resource management and allocation filed. Nevertheless, such a study gradually evolves to an MAC layer and a physical layer, and there are attempts to combine deep learning and wireless transmission especially in a physical layer. As for a fundamental signal processing and communication mechanism, AI-based physical layer transmission means application of a signal processing and communication mechanism based on an AI driver, instead of a traditional communication framework. For example, it may include deep learning-based channel coding and decoding, deep learning-based signal estimation and detection, deep learning-based MIMO mechanism, and AI-based resource scheduling and allocation.

Specific Embodiments of the Present Disclosure

Figure 15:
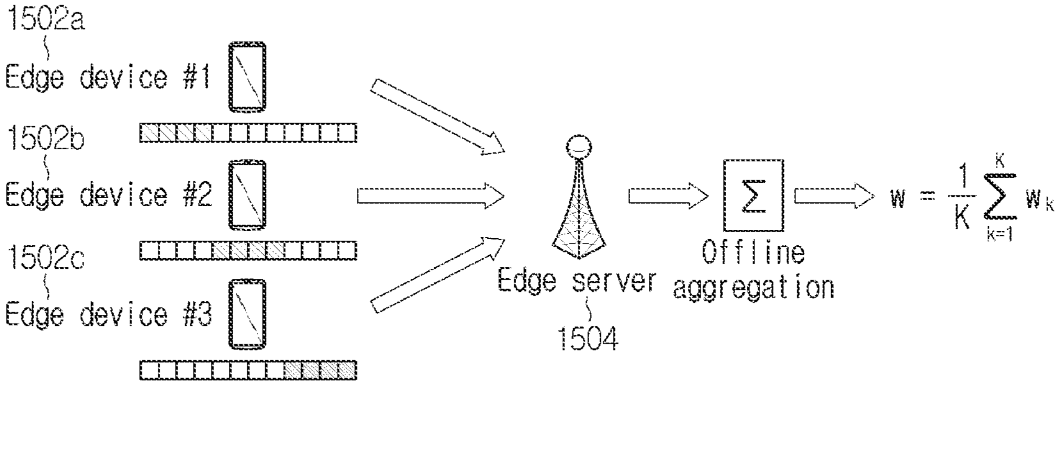
FIG. 15 is a diagram illustrating an example of federated learning applicable to the present disclosure.
Figure 16:
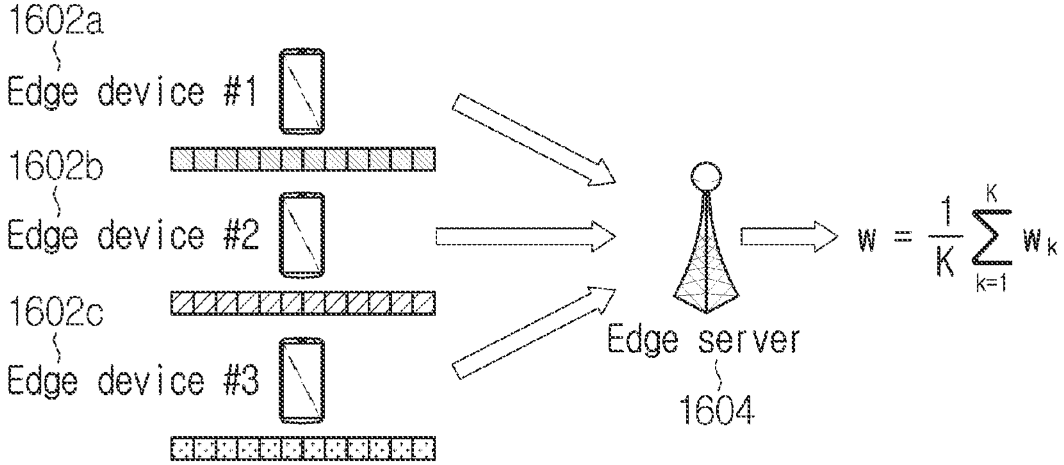
FIG. 16 illustrates an example of federated learning applicable to the present disclosure.

FIG. 15 and FIG. 16 illustrate federated learning and air computation-based federated learning. FIG. 15 illustrates an example of federated learning applicable to the present disclosure. Federated learning is one of distributed machine learning techniques. Federated learning is a technique of sharing a server and a parameter among multiple devices that are learning subjects. For example, in federated learning, multiple devices as the learning agent and a server share a weight or gradient of a local model. The server gathers a local model parameter of each device and updates a global parameter. The server does not share raw data of each device with the devices. Accordingly, federated learning may reduce communication overhead of a data transmission process and protect personal information.

Federated learning based on orthogonal multiple access is operated as in FIG. 15. Devices **1502*a*, 1502*b* and 1502*c* transmit a local parameter in each allocated resource. A server 1504 performs offline aggregation for a parameter from a device. Generally, a server derives a global parameter through averaging for all local parameters. In addition, the server transmits the global parameter thus derived to devices. However, as the number of devices joining learning increases under a limited radio resource, a time for the server to update the global parameter is delayed. In order to solve such a problem, a study on air computation (AirComp)-based federated learning is underway. AirComp-based federated learning is described in FIG. 16** below. In the present disclosure, a server may refer to a base station and perform federated learning with a plurality of terminals. In addition, a terminal may be referred to as a user.

FIG. 16 illustrates an example of federated learning applicable to the present disclosure. Referring to FIG. 16, AirComp-based federated learning is a scheme in which all the devices **1602*a*, 1602*b* and 1602*c* use a same resource to transmit a local parameter to a server 1604**. The server may obtain an aggregation of local parameters through a superposition feature of an analog waveform of a received signal. In AirComp-based federated learning, since a local parameter is transmitted through a same resource, the number of devices participating in the learning has no significant effect on latency. In case a device performing federated learning transmits a weight, an eavesdropper, which is closer to the device, may receive learned data. As the eavesdropper may receive the data in a better wireless channel than the server, privacy leak may occur. The present disclosure proposes a method for preventing privacy leak of terminals that perform federated learning.

Figure 17:
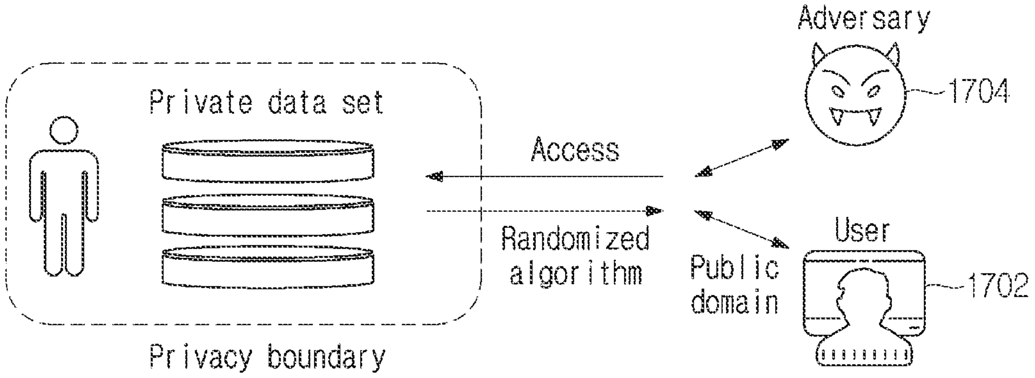
FIG. 17 illustrates an example of differential privacy applicable to the present disclosure.

FIG. 17 illustrates an example of differential privacy applicable to the present disclosure.

As a method of blocking a privacy attack on a data set for machine learning, a study is underway to apply differential privacy. Differential privacy is simple to implement as compared to other security algorithms and is also mathematically defined and established. In addition, a differential privacy algorithm may easily quantify a privacy level, even w % ben being complexly constructed.

An adversary 1704 attempts a privacy attack with no purpose of machine learning but to find out information on a data set. For example, the adversary 1704 may attempt a privacy attach to find out information on a data set associated with a terminal 1702. In order to block the privacy attack, a device may enclose the data set by a privacy boundary and allow access only to a special interface for machine learning. In case the adversary approaches the data set through such an interface, the device may apply a randomized mechanism to probabilistically prevent the adversary from finding out information on each data set. An interface mainly for machine learning may consist of mostly statistical information like mean, median, variance, order statics, synthetic data, and an ML model.

A randomized mechanism of differential privacy is ($\in$, $\delta$) differential privacy, which may be defined as in Formula 1 below.

$$P[M(x)\in E]\leq e^{\in}P[M(x')\in E]+\delta \quad \text{[Formula 1]}$$

Here, x and x' are adjacent data sets. $\in$ is defined as a privacy level. In case $\in$ is large, the privacy level is lowered. M(x) is a result of applying the randomized mechanism to a response to a data set x. E is a range that an interface output can have. $\delta$ is a probability of violating a given $\in$ privacy level, having a very small value.

Meanwhile, there is an ongoing study that attempts to apply differential privacy in federated learning through air computation. In case a server performs data aggregation, differential privacy may be applied. In the present disclosure, the terms "server" and -base station" may be used interchangeably. In case a server receives aggregated data, the server may secure differential privacy by using a background noise and a common bias power of an edge device.

M(x)=f(x)+n means various randomized mechanism for the response f(x) for a data set x. A Gaussian mechanism, in which the noise n satisfies $\sigma^2$ in M(x), satisfies ($\in$, $\delta$) differential privacy in such a condition as Formula 2 below.

$$\sigma^2 \geq \frac{2\ln\left(\frac{1.25}{\delta}\right)(\Delta f)^2}{\epsilon^2} \quad \Delta f: \max_{x,x'}\|f(x)-f(x')\| \quad \text{[Formula 2]}$$

Meanwhile, in case an edge device transmits a weight, an eavesdropper, which is nearer than a server, may receive learned data. As the eavesdropper may receive data in a better wireless channel than a server, privacy leak may occur. This is defined as central differential privacy. Here, the Gaussian mechanism is defined as in Formula 3 below.

$$M(x) = \sum_{i\in x}^{K} f(i) + n \quad \text{[Formula 3]}$$

In Formula 3, f(i) is a learning parameter for a terminal i.

To solve the above-described problem, the present disclosure proposes a method of applying differential privacy to data transmission of an edge device. In addition, the present disclosure proposes a method of operating a pseudo-random sequence, which considers the problem of degraded machine accuracy of a server together, which occurs when differential privacy is applied.

Differential privacy of an edge device is defined as local differential privacy. This may be expressed as in Formula 4 below.

$$M(x) = \frac{1}{|D|}\sum_{i\in x}^{|D|}\arg_w \min L(w, D_i) + n \quad \text{[Formula 4]}$$

In Formula 4, L represents a loss function. D is a set of a data set x. n represents a randomized algorithm satisfying differential privacy. As an example, n may be a randomized algorithm satisfying Gaussian. Differential privacy noise is applied to a transmitter of an edge device. Accordingly, no privacy leak to a nearby eavesdropper occurs.

In such a case, since the transmitter of the edge device transmits the differential privacy noise, an aggregate of noise is also received by a server receiver, and thus central differential privacy is satisfied. However, the accuracy of machine learning may be lowered.

The present disclosure proposes a method of operating a pseudo random sequence for generating a differential privacy Gaussian noise that does not cause or minimizes accuracy issue at a server side through cooperation between an edge device and an edge server.

Many types of pseudo random sequences exist for security purpose. In the present disclosure, an edge device may transmit a pseudo random sequence that is agreed with a server in advance. Accordingly, an aggregated sum of the pseudo random sequence received by the server may satisfy central differential privacy.

Hereinafter, a method of generating and transmitting a pseudo random sequence will be described. A symbol signal transmitted by an edge device may be modeled as in Formula 5a below.

$$y_k = \sqrt{p_k}(w_k + n_k),\ \sigma_{n_k}^2 \geq \frac{2\ln\left(\frac{1.25}{\delta_k}\right)(\Delta w_k)^2}{\epsilon_k^2} \quad \text{[Formula 5a]}$$

In Formula 5a, $w_k$ represents a weight of a k-th edge device. $p_k$ represents a gain for transmitting a weight and noise of the k-th edge device. $p_k$ contains an inverse and common gain of a channel. Nk represents a pseudo random noise satisfying differential privacy pdf for transmitting the weight of the k-th edge device. $\in_k$ represents local differential privacy $\in$ of the k-th edge device. $\delta_k$ represents local differential privacy $\delta$ of the k-th edge device. $\Delta w_k$ represents the sensitivity $\Delta$w of the k-th edge device. $\Delta$w may be expressed as in Formula 5b below.

$$\Delta w: \max_{D,D'}\|w(D) - w(D')\|, \quad \text{[Formula 5b]}$$

A symbol signal received by an edge server may be expressed as in Formula 6 below.

$$r = \sqrt{c}\sum_{k}^{K} w_k + \sqrt{c}\sum_{k}^{K} n_k + n_0$$

In Formula 6, $\sqrt{c}$ represents a common gain. $n_o$ represents a receiver noise. In Formula 6, the second term $$\sqrt{c}\sum_{k}^{K} n_k$$

is a noise sum of local differential privacy. The second term may function as a noise term in central differential privacy that is determined based on $\sqrt{c}$ and $n_o$. It is important to control $$\sqrt{c}\sum_{k}^{K} n_k$$

power at a specific level. For example, it is important to control $$\sqrt{c}\sum_{k}^{K} n_k$$

power at $$\sigma_c^2$$

level. In case this value becomes 0, both central differential privacy and local differential privacy are satisfied. Central differential privacy may be satisfied by being controlled based on $$\sigma_c^2$$

value, without depending on $\sqrt{c}$ and $n_o$.

The k-th device may transmit nk, that is, a sum of products of a pseudo random sequence $u_{kj}$ and a corresponding gain $a_{kj}$, as in Formula 7 below, to a symbol.

$$n_k = \sum_{j}^{P} a_{kj}u_{kj} \text{ [illegible] } N = Ue \quad \text{[Formula 7]}$$

In Formula 7, $N^T$ is $[n_1, \ldots . n_k]$. U is a matrix where the matrix element (k, j) with K×P size constitutes $a_{k,j}u_{k,j}$. e is a column vector with a size of P, which consists only of 1. The sum of all these noises should be 0. Accordingly. Formula 8 below should be satisfied.

$$e^T N = e^T U e = 0 \quad \text{[Formula 8]}$$

The vector $$B^T \text{ is } [\sigma_{n_1}^2, \ldots, \sigma_{n_k}^2].$$

$B^T$ is a variance value of noise $n_k$ reflecting a local differential privacy requirement of each device. An average of $u_{kj}$ is 0. $u_{kj}$ is independent of each other. Accordingly. Formula 9 below is derived.

$$E[n_k^2] = \sum_{j}^{P} a_{k,j}^2 - E[u_{k,j}^2] \quad \text{[Formula 9]}$$

Assuming Formula 10a below, the variance matrix like Formula 10b may be satisfied.

$$E[u_{k,j}^2] = 1 \quad \text{[Formula 10a]}$$

B=Ge

In Formula 10b, G is a matrix with K×P size, which is generated by squaring only the gain $a_{kj}$ in the matrix U. Each element $g_{kj}$ of G is $$a_{kj}^2.$$

e is a column matrix consisting only of 1. The present disclosure proposes a trade-off method of complexity and security of a device, while the sum of B is 0 and B satisfies a variance matrix.

The matrix U is set as a skew-symmetry square matrix with trace (U)=0 and a band matrix. That is, Formula 11 below is satisfied.

$$a_{jk} = -a_{kj} \quad \text{[Formula 11]}$$

$$u_{jk} = u_{kj}$$

$$\sum_{j}^{K} a_{kk}u_{kk} = 0$$

In this case, $e^T Ue=0$ may be satisfied. In addition, a device may adjust the number of pseudo random sequences to be generated based on symmetry and bandwidth w. Accordingly, security and complexity may have a trade-off relationship. For symmetry, a device designs a band matrix with upper and lower bandwidths being identical. For example, if K=6 and bandwidth w=1, a matrix becomes a tridiagonal matrix like Formula 12 below, where one more diagonal element exists above and below a diagonal component respectively.

$$\begin{bmatrix} f_1 & a & 0 & 0 & 0 & 0 \\ -a & f_2 & b & 0 & 0 & 0 \\ 0 & -b & f_3 & c & 0 & 0 \\ 0 & 0 & -c & f_4 & d & 0 \\ 0 & 0 & 0 & -d & f_5 & e \\ 0 & 0 & 0 & 0 & -e & f_6 \end{bmatrix} \quad \text{[Formula 12]}$$

The matrix G has an element of $$g_{kj} = a_{kj}^2,$$

which is a positive value. Accordingly, G may be both a symmetric matrix and a band matrix. This band matrix has a bandwidth of w. This band matrix should satisfy B=Ge. In case the bandwidths w and B are given, the unknown $g_{kj}$ may be obtained by B=Ge. In case the number of equations is m and the number of unknowns is n, m and n may be expressed as in Formula 13 below.

$$m = K$$ [Formula 13]

$$n = \frac{1}{2}\{K(K+1) - (K-w)(K-w+1)\}$$

Accordingly, the problem may be solved based on a linear equation Ax=B with a matrix A with a matrix size of m, n. The present disclosure assumes m<n. Here, x is a column matrix consisting of $g_{kj}$. In addition, the system is under-determined, there may be an infinite number of solutions. A solution may be obtained based on various criteria. As an example, the solution $g_{kj}$ may be obtained by solving a standard form linear programming (LP) optimization problem that minimizes an overall power gain $\|X\|_1$. In a sum of various pseudo random sequences, which a device transmits to one symbol by minimizing an overall power, a specific sequence $a_{k,j}u_{k,j}$ is not dominant in power. Formula 14, which is related to minimizing the overall power gain, may be expressed as follows.

$$\text{minimize } \|x\|_1$$

$$\text{subject to } Ax=B, x \succcurlyeq 0$$ [Formula 14]

As an example, security may be enhanced by using a pseudo random sequence where four devices are all available. That is, when a bandwidth is set to 3 and every diagonal component is set to 0, trace (U) may be set to 0.

Under the condition of $e^T Ne=0$, U may be expressed as in Formula 15 below.

$$U = \begin{bmatrix} 0 & a_{1,2}u_{1,2} & a_{1,3}u_{1,3} & a_{1,4}u_{1,4} \\ -a_{1,2}u_{1,2} & 0 & a_{2,3}u_{2,3} & a_{2,4}u_{2,4} \\ -a_{1,3}u_{1,3} & -a_{2,3}u_{2,3} & 0 & a_{3,4}u_{3,4} \\ -a_{1,4}u_{1,4} & -a_{2,4}u_{2,4} & -a_{3,4}u_{3,4} & 0 \end{bmatrix}$$ [Formula 15]

In case a noise vector corresponding to the differential privacy of four devices is $B^T=[1,2,3,4]$, the following Formula 16 may be derived. In addition, a minimum power value of power sum $\|X\|$ may be obtained based on linear programming.

$$\text{If } B = \begin{bmatrix} 0 & g_1 & g_4 & g_6 \\ g_1 & 0 & g_2 & g_5 \\ g_4 & g_2 & 0 & g_3 \\ g_6 & g_5 & g_3 & 0 \end{bmatrix} e,$$ [Formula 16]

$$Ax = B \rightarrow \begin{bmatrix} 1 & 0 & 0 & 1 & 0 & 1 \\ 1 & 1 & 0 & 0 & 1 & 0 \\ 0 & 1 & 1 & 1 & 0 & 0 \\ 0 & 0 & 1 & 0 & 1 & 1 \end{bmatrix} \begin{bmatrix} g_1 \\ g_2 \\ g_3 \\ g_4 \\ g_5 \\ g_6 \end{bmatrix} = \begin{bmatrix} 1 \\ 2 \\ 3 \\ 4 \end{bmatrix}$$

In this case, x minimizing the power sum may be expressed as in Formula 17 below.

$$x = [2.07*10^{-1}\ 5.25*10^{-1}\ 2,21\ 2.68*10^{-1}\ 1.27\ 5.25*10^{-1}]$$ [Formula 17]

As another example, in case there are six devices, the matrix U, which lowers security a bit but generates a least number of pseudo random matrices, has a bandwidth of 1. The form of the matrix U may be expressed in Formula 18 below.

$$U = \begin{bmatrix} 0 & q & 0 & 0 & 0 & 0 \\ -q & 0 & r & 0 & 0 & 0 \\ 0 & -r & 0 & s & 0 & 0 \\ 0 & 0 & -s & 0 & t & 0 \\ 0 & 0 & 0 & -t & 0 & u \\ 0 & 0 & 0 & 0 & -u & 0 \end{bmatrix}$$ [Formula 18]

Figure 18:
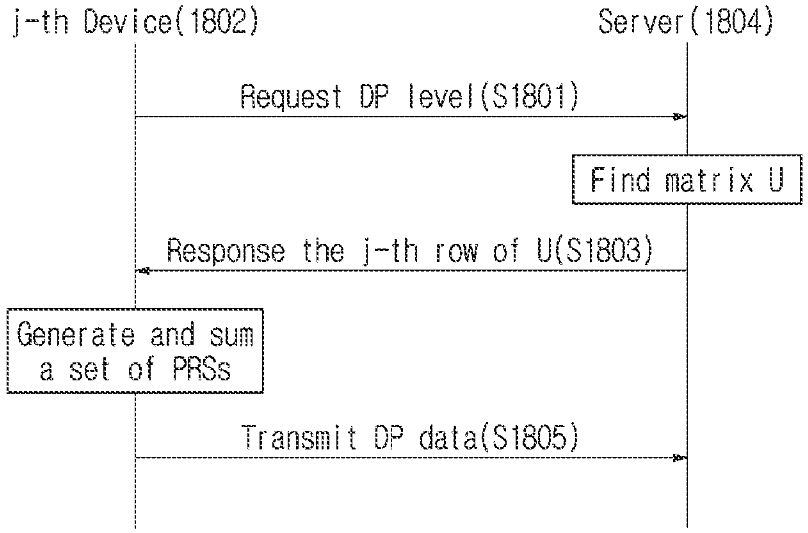
FIG. 18 illustrates an example of a terminal operating procedure applicable to the present disclosure.

FIG. 18 illustrates an example of a terminal operating procedure applicable to the present disclosure. In the present disclosure, terms "device" and "terminal" may be used interchangeably. In step S1801, a j-th terminal 1802 transmits a differential privacy level (DP level) for local differential privacy to a server 1804. Herein, the terminal may be a terminal that participates in federated learning based on air computation. As described in FIG. 17, the server receiving the differential privacy level finds a matrix U. As an example, the server finds the matrix U based on a bandwidth of a band matrix. At step S1803, the server 1804 transmits a part corresponding to a terminal requesting the differential privacy level in the matrix to the terminal. As a concrete example, the server may transmit information including a j-th row in the matrix U to the j-th terminal. Information on a row of the matrix U may be exchanged based on a typical K exchange algorithm. A terminal, which receives matrix information, may generate a pseudo random sequence based on the received matrix information. In addition, the terminal may aggregate pseudo random sequences thus generated. At step S1805, the terminal may transmit the aggregated pseudo random sequences together with data to the server. The terminal and the server may make an agreement about $u_{i,j}$ of the matrix U in advance. In this case, the most important value of row is $a_{i,j}$. A bandwidth of the matrix U may be made by setting $a_{i,j}$ of an element outside a band to 0. In such a case, the terminal and the server may exchange only the $a_{i,j}$ value.

Figure 19:
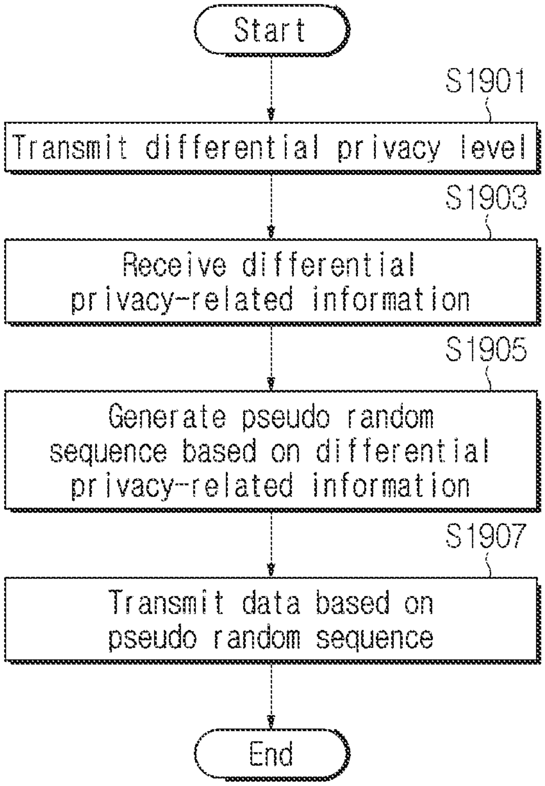
FIG. 19 illustrates an example of a terminal operating procedure applicable to the present disclosure.

FIG. 19 illustrates an example of a terminal operating procedure applicable to the present disclosure. The terminal may receive federated learning-related configuration information from a base station. The terminal may configure a resource associated with federated learning based on the federated learning-related configuration information. The federated learning-related configuration information may include information indicating performance of the federated learning. In case the information indicating the performance of the federated learning indicates performance of federated learning, the terminal may configure the resource associated with the federated learning.

In step S1901, the terminal transmits a differential privacy level to the base station. The base station, which receives the differential privacy level, may find a matrix as described in FIG. 17 and FIG. 18. In step S1903, the terminal receives differential privacy-related information from the base station. The differential privacy-related information may be based on a differential privacy level. The differential privacy-related information may include information on the number of pseudo random sequences generated by the terminal. The information on the number of pseudo random sequences may be determined based on a bandwidth of a band matrix. As an example, as described in FIG. 17, the terminal may receive matrix information from the base station.

In step S1905, the terminal generates a pseudo random sequence based on differential privacy-related information. For example, the differential privacy-related information may include information indicating pseudo random sequence information of terminals associated with the federated learning and pseudo random sequence information of the terminal. The terminal may generate the pseudo random sequence based on information indicating the pseudo random sequence information of the terminal in the pseudo random sequence information of terminals associated with the federated learning.

In step S1907, based on the generated pseudo random sequence, the terminal may transmit data to the base station. As an example, the data may be transmitted based on the configured resource. In addition, the other terminal associated with the federated learning may transmit data based on the configured resource. That is, terminals may perform federated learning based on air-computation.

Figure 20:
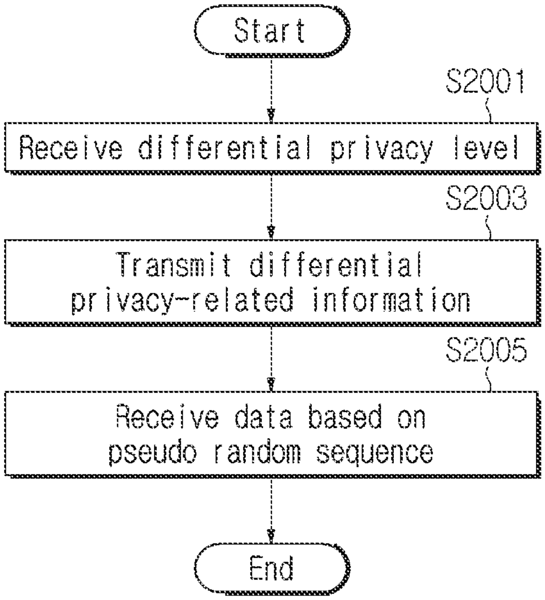
FIG. 20 illustrates an example of a base station operating procedure applicable to the present disclosure.

FIG. 20 illustrates an example of a base station operating procedure applicable to the present disclosure. A base station may transmit federated learning-related configuration information to a terminal. The terminal may configure a resource associated with federated learning based on the federated learning-related configuration information. The federated learning-related configuration information may include information indicating performance of the federated learning. In case the information indicating the performance of federated learning indicates performance of federated learning, the terminal may configure a resource associated with the federated learning.

In step S2001, the base station receives a differential privacy level from the terminal. The base station, which receives the differential privacy level, may find a matrix as described in FIG. 17 and FIG. 18.

In step S2003, the base station transmits differential privacy-related information to the terminal. The differential privacy-related information may be based on a differential privacy level that the base station receives. As an example, as described in FIG. 17, the base station may transmit matrix information associated with differential privacy to the terminal.

In step S2005, the base station receives data based on a pseudo random sequence. As described in FIG. 17, the terminal may generate a pseudo random sequence based on differential privacy-related information. That is, the pseudo random sequence may be generated based on the differential privacy-related information. A resource associated with federated learning may be configured based on the federated learning-related configuration information, and the data may be transmitted based on the configured resource.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

The invention claimed is:

1. A method of operating a terminal in a wireless communication system, the method comprising:
- receiving configuration information from a base station;
- configuring a resource based on the configuration information;
- transmitting a differential privacy level to the base station;
- receiving information related to security from the base station; and
- transmitting data to the base station,
- wherein the configuration information is related to federated learning,
- wherein the data is transmitted based on the configured resource and a pseudo random sequence that is generated based on the information related to security,
- wherein the information related to security includes a differential privacy-related information,
- wherein the differential privacy-related information includes information on the number of pseudo random sequences generated by the terminal, and
- wherein the information on the number of the pseudo random sequences is determined based on a bandwidth of a band matrix.

2. The method of claim 1, wherein other terminals associated with the federated learning transmits data based on the resource.

3. The method of claim 1, wherein the configuration information includes information indicating performance of the federated learning, and
- wherein, in case that the information indicating the performance of the federated learning indicates the performance of the federated learning, the terminal configures the resource associated with the federated learning.

4. The method of claim 1, wherein the band matrix is determined based on noise of the base station and sum of differential privacy noise of the terminal.

5. The method of claim 1, wherein the differential privacy-related information includes pseudo random sequence information of terminals associated with the federated learning and the information indicating pseudo random sequence information of the terminal, and wherein the terminal generates the pseudo random sequence based on information indicating the pseudo random sequence of the terminal in the pseudo random sequence information of the terminals associated with the federated learning.

6. A terminal configured to operate in a wireless communication system, the terminal comprising:

a transceiver; and a processor coupled to the transceiver, wherein the processor is configured to:

receive configuration information from a base station;

configure a resource based on the configuration information;

transmit a differential privacy level to the base station;

receive information related to security from the base station; and transmit data to the base station, wherein the configuration information is related to federated learning, wherein the data is transmitted based on the configured resource and a pseudo random sequence that is generated based on the information related to security, wherein the information related to security includes a differential privacy-related information, wherein the differential privacy-related information includes information on the number of pseudo random sequences generated by the terminal, and wherein the information on the number of the pseudo random sequences is determined based on a bandwidth of a band matrix.

7. The terminal of claim 6, wherein other terminals associated with the federated learning transmit data based on the resource.

8. The terminal of claim 6, wherein the configuration information includes information indicating performance of the federated learning, and wherein, in case that the information indicating the performance of the federated learning indicates the performance of the federated learning, the terminal configures the resource associated with the federated learning.

9. The terminal of claim 6, wherein the band matrix is determined based on noise of the base station and sum of differential privacy noise of the terminal.

10. The terminal of claim 6, wherein the differential privacy-related information includes information indicating pseudo random sequence information of terminals associated with the federated learning and pseudo random sequence information of the terminal, and wherein the terminal generates the pseudo random sequence based on information indicating the pseudo random sequence of the terminal in the pseudo random sequence information of the terminals associated with the federated learning.

11. A base station configured to operate in a wireless communication system, the base station comprising:

a transceiver; and a processor coupled to the transceiver, wherein the processor is configured to:

transmit configuration information to a terminal, receive a differential privacy level from the terminal, determine a band matrix based on the differential privacy level, transmit, to the terminal, the differential privacy-related information determined based on the band matrix, and receive data from the terminal, wherein the configuration information is related to federated learning, and wherein the data is transmitted based on a resource and a pseudo random sequence.

12. The base station of claim 11, wherein the differential privacy-related information includes information on the number of pseudo random sequences generated by the terminal.

13. The base station of claim 12, wherein the band matrix is determined based on noise of the base station and sum of differential privacy noise of the terminal.

14. The base station of claim 12, wherein the differential privacy-related information includes information indicating pseudo random sequence information of terminals associated with the federated learning and pseudo random sequence information of the terminal.

* * * * *